(12) United States Patent
Fairy

(10) Patent No.: US 7,381,050 B2
(45) Date of Patent: Jun. 3, 2008

(54) SNAP ON FLANGE FOR INJECTION MOLDING NOZZLE

(75) Inventor: Fabrice Fairy, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 261 days.

(21) Appl. No.: 11/252,883

(22) Filed: Oct. 19, 2005

(65) Prior Publication Data

US 2006/0083812 A1    Apr. 20, 2006

Related U.S. Application Data

(60) Provisional application No. 60/619,920, filed on Oct. 20, 2004.

(51) Int. Cl.
*B29C 45/20* (2006.01)

(52) U.S. Cl. .................................. 425/549; 264/328.15

(58) Field of Classification Search ................ 425/549; 264/328.15
See application file for complete search history.

(56) References Cited

U.S. PATENT DOCUMENTS

| | | |
|---|---|---|
| 4,173,448 A | 11/1979 | Rees et al. |
| 4,268,241 A | 5/1981 | Rees et al. |
| 4,279,588 A | 7/1981 | Gellert |
| 4,344,750 A | 8/1982 | Gellert |
| 4,386,262 A | 5/1983 | Gellert |
| 4,403,405 A | 9/1983 | Gellert |
| 4,433,969 A | 2/1984 | Gellert |
| 4,492,555 A | 1/1985 | Schulte |
| 4,588,367 A | 5/1986 | Schad |
| 4,662,837 A | 5/1987 | Anderson |
| 4,666,396 A | 5/1987 | Shaw |
| 4,682,945 A | 7/1987 | Schad |
| 4,698,013 A | 10/1987 | Butcher |
| 4,771,164 A | 9/1988 | Gellert |
| 4,837,925 A | 6/1989 | Gellert |
| 4,865,535 A | 9/1989 | Gellert |
| 4,911,636 A | 3/1990 | Gellert |
| 4,945,630 A | 8/1990 | Gellert |
| 5,046,942 A | 9/1991 | Gellert |
| 5,135,377 A | 8/1992 | Gellert |
| 5,217,730 A | 6/1993 | Teng |
| 5,235,737 A | 8/1993 | Gellert |
| 5,266,023 A | 11/1993 | Renwick |
| 5,282,735 A | 2/1994 | Gellert |
| 5,326,251 A | 7/1994 | Gellert |
| 5,429,491 A | 7/1995 | Gellert |
| 5,437,093 A | 8/1995 | Gellert |
| 5,474,440 A | 12/1995 | Gellert |
| 5,507,635 A | 4/1996 | Gellert |
| 5,614,233 A | 3/1997 | Gellert |
| 5,704,113 A | 1/1998 | Mak |
| 5,896,640 A | 4/1999 | Lazinski et al. |
| 5,955,120 A | 9/1999 | Deissler |
| 6,009,616 A | 1/2000 | Gellert |

(Continued)

*Primary Examiner*—Tim Heitbrink
(74) *Attorney, Agent, or Firm*—Medler Ferro PLLC

(57) ABSTRACT

A nozzle for an injection molding apparatus, including a nozzle body having a nozzle melt channel for receiving a melt stream from a manifold melt channel, and a collar mounted on the nozzle body. One of the nozzle body and the collar has a shoulder formed therein and the other of the nozzle body and collar has a radially disposed protrusion for engaging the shoulder to act against separation of the collar from the nozzle body.

19 Claims, 4 Drawing Sheets

U.S. PATENT DOCUMENTS

| | | |
|---|---|---|
| 6,062,846 A | 5/2000 | Kalemba |
| 6,162,043 A | 12/2000 | Gellert |
| 6,220,851 B1 | 4/2001 | Jenko |
| 6,261,084 B1 | 7/2001 | Schmidt |
| 6,287,107 B1 | 9/2001 | Kazmer et al. |
| 6,315,549 B1 | 11/2001 | Jenko et al. |
| 6,323,465 B1 | 11/2001 | Gellert et al. |
| 6,530,770 B2 | 3/2003 | Sheffield et al. |
| 6,533,571 B2 * | 3/2003 | Fikani ........................ 425/549 |
| 6,625,873 B1 | 9/2003 | Gellert |
| 2003/0124216 A1 | 7/2003 | Guenther et al. |

* cited by examiner

SNAP ON FLANGE FOR INJECTION MOLDING NOZZLE

CROSS REFERENCE TO RELATED APPLICATIONS

This application claims the benefit of U.S. Provisional Application No. 60/619,920, filed Oct. 20, 2004, which is incorporated by reference herein in its entirety.

FIELD OF THE INVENTION

The present invention relates to an injection molding apparatus, and more particularly to an injection molding nozzle.

BACKGROUND OF THE INVENTION

Nozzles used in injection molding apparatus will often have a flange or collar located at a head or upstream end of the nozzle in order to align the nozzle with the gate and/or align the nozzle channel with the manifold melt channel.

There is a need for a nozzle having a flange mounted thereto in a durable, reliable, efficient and/or cost effective manner.

SUMMARY OF THE INVENTION

According to one aspect of the present invention, there is provided an injection molding nozzle. The nozzle includes a nozzle body having a nozzle melt channel for receiving a melt stream from a manifold melt channel and a collar mounted on the nozzle body. One of the nozzle body and the collar has a shoulder formed therein and the other of the nozzle body and collar has a radially disposed protrusion for engaging the shoulder to act against separation of the collar from the nozzle body.

According to another aspect of the present invention, there is provided an injection molding apparatus. The injection molding apparatus includes a manifold having a manifold melt channel for receiving a melt stream of moldable material, a mold plate spaced apart from the manifold and having a mold plate recess formed therein in alignment with a gate leading to a mold cavity, and a nozzle. The nozzle includes (i) a nozzle body with an upstream end coupled to the manifold and defining a nozzle melt channel for receiving the melt stream from the manifold melt channel, a portion of the nozzle body being received in the mold plate recess, and (ii) a locating collar removably mounted to the nozzle body and having a surface engaging the mold plate for locating the nozzle body relative to the mold plate. One of the nozzle body and the collar has a shoulder formed therein and the other of the nozzle body and collar has a radially disposed protrusion for engaging the shoulder to act against separation of the collar from the nozzle body.

Other aspects and features of the present invention will become apparent to those ordinarily skilled in the art upon review of the following description of specific embodiments of the invention in conjunction with the accompanying figures.

DETAILED DESCRIPTION OF THE DRAWINGS

Embodiments of the present invention will now be described more fully with reference to the accompanying drawings in which like reference numerals indicate similar structure.

FIG. 1 is a sectional view of a portion of an injection molding apparatus according to one embodiment of the present invention.

FIG. 2. is a partial cutaway view of an injection molding nozzle according to one embodiment of the present invention showing a flange of the nozzle in a disengaged position.

DETAILED DESCRIPTION OF THE INVENTION

Figure 1:
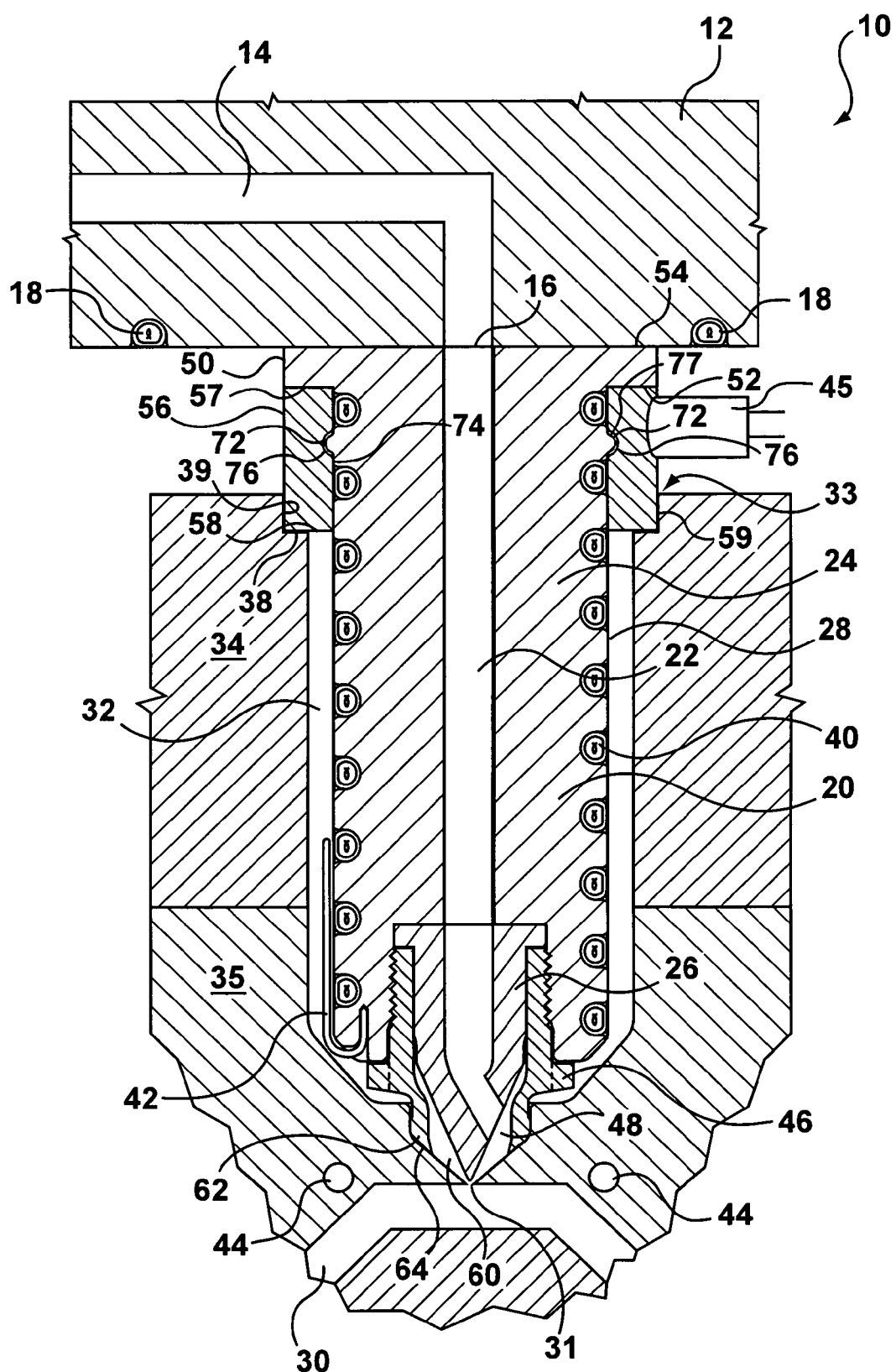

Reference is first made to FIG. I which shows a portion of an injection molding apparatus according to one embodiment of the present invention indicated generally by reference numeral 10. The injection molding apparatus 10 includes a manifold 12 having a manifold melt channel 14 extending therethrough. A melt stream of moldable material is received in the manifold melt channel 14 from a machine nozzle (not shown) through an inlet (not shown) in the manifold 12. The melt stream flows through the manifold melt channel 14 to an outlet 16. Manifold heaters 18 are provided in the manifold 12 to maintain the melt stream at a desired temperature.

Nozzles 20 are located between the manifold 12 and respective mold cavities 30. Although only a single nozzle 20 in shown in FIG. 1, the apparatus 10 will typically include a plurality of nozzles 20. The nozzles 20 are received in recesses or openings 32 provided in a first mold plate 34 and a second mold plate 35. Although first mold plates 34 and second mold plates 35 are shown, a single mold plate or a modular mold plate assembly may also be used.

In an example embodiment, each nozzle 20 includes a nozzle body 24 and a nozzle tip 26. The nozzle tip 26 is removably attached to the nozzle body 24. The nozzle body 24 has a front end (an end that is downstream relative to melt flow) and a rear end (an end that is upstream relative to melt flow). The nozzle body 24 has a generally cylindrical outer surface 28. The nozzle also includes an integral flange 50 at the upstream end of the nozzle body 24. The flange 50 has a lower surface 52 and an upper surface 54 for contacting the manifold 12. An insulating collar or flange 56 surrounds a portion of the nozzle body 24 below the flange 50 and abuts a seat or shoulder 38 of the first mold plate 34. The collar 56 is generally cylindrical and provides a seal between the nozzle 20 and the manifold 12 as will be described in more detail below.

Each nozzle 20 defines a nozzle melt channel 22 for receiving the melt stream from the respective manifold outlet 16 and delivering the melt stream to the respective mold cavity 30 through respective mold gates 31. The mold gates 31 are provided at the entrance to the mold cavities 30, adjacent nozzle tips 26 of the nozzles 20. Each nozzle 20 is further provided with a heating element 40 thermally connected to the nozzle body 24 for heating melt in the nozzle melt channel 22. The heating element 40 helps to maintain the melt stream at a desired temperature as it passes through the nozzle 20. The nozzles 20 may also have a thermocouple 42. Cooling channels 44 are located adjacent the mold cavities 30 and transport a cooling fluid to cool and solidify the melt in the mold cavities 30. A terminal connector 45 houses electrical leads for the heating element 40. Although an embedded helical nozzle heating element 40 is shown, other nozzle heating arrangements are used in various embodiments.

In an example embodiment, a tip retainer 46 is provided between nozzle tip 26 and the inner wall of the opening 32. The tip retainer 46 defines a tip retainer melt channel 48 in fluid communication with and downstream from the nozzle melt channel 22. The tip retainer 46 prevents backflow of melt from traveling further into opening 32 from nozzle tip 26 by providing a seal between the second mold plate 35 at an inner surface of the opening 32 within a melt chamber 60. Melt chamber 60 forms a portion of the opening 32 adjacent to mold gate 31. An end surface 62 of the tip retainer 46 abuts a surface 64 of the melt chamber 60 providing the seal and restricting the expansion of the nozzle 20 in the direction of mold gate 31. Although a tip retainer 46 is shown, the tip 26 may be attached to the nozzle 20 by any other means known in the art, and may be integral with nozzle 20.

In operation, a melt stream of moldable material is injected from a machine nozzle and flows through manifold melt channel 14, nozzle melt channel 22 and past mold gate 31 into mold cavity 30. The melt in mold cavity 30 is then cooled creating a molded part that is subsequently ejected from the injection molding apparatus 10.

Referring to FIG. 1 an example embodiment of the collar 56 will be explained in more detail. The collar 56 is made of material suitable for withstanding the molding conditions. In some embodiments, the collar is made of a material having a lower thermal conductivity than the nozzle 20 material, such as titanium or ceramic, for example. The collar 56 has an upper or first surface 57 for engaging the lower surface 52 of nozzle flange 50, an opposite facing lower or second surface 58 for engaging the shoulder 38 of mold plate recess 33 and an outer mold plate contacting surface 59 for contacting annular surface 39 of mold plate recess 33.

To assemble the hot runner system, the collar 56 must be securely attached to the nozzle 20. To facilitate pre-assembly mounting of the collar 56 to the nozzle body 24, the outer surface 28 of the nozzle body 24 is provided with an integrally formed radially extending protrusion such as an annular projection or ring 72. The ring 72 is unitarily formed from the same material as and integrally with the upper end portion of nozzle body 24. The collar 56 has an inner surface 74 provided with an engaging portion such as an annular recess 76 having a shoulder 77 for engaging the annular projection 72 of the nozzle body 24 and thereby securing the collar 56 to the nozzle body 24.

In order to mount the collar 56 onto the nozzle body 24, the collar 56 is slipped over the tip end of the nozzle body and pushed towards the nozzle flange 50 until it snaps into place when annular projection 72 snaps into annular recess 76.

When the annular projection 72 is located in annular recess 76, the upper surface 57 of the collar 56 is located adjacent the lower surface 52 of the flange 50. Once mounted, the cooperation of the annular projection 72 and the annular recess 76 secures collar 56 to the nozzle body 24 thereby preventing the collar 56 from easily slipping off of the nozzle body 24. In some example embodiments, the projection and recess 76 are respectively sized and the outer and inner surfaces of the nozzle body and collar respectively sized to allow a small degree of axial and/or radial movement of the collar 56 relative to the nozzle body 24 to account for the differing thermal expansion properties of the two components. When the collar 56 is mounted to the nozzle body, the collar is not subjected to an excessive amount of radial loading.

In some example embodiments, the annular projection 72 may be integrally formed on an inner surface of the collar 56 and the annular recess 76 formed on an outer surface of the nozzle body 24. In some example embodiments, the annular projection 72 could be replaced with one or more non-annular radial protrusions that may be circumferentially spaced and/or axially staggered around the outer surface of the nozzle body or inner surface of the collar 56. By limiting the contact between the nozzle 20 and collar 56, the heat transfer from the nozzle 20 to the collar 56, which is in contact with the mold plate 34, is reduced. Similarly, in some example embodiments, the engagement shoulder 77 provided by annular recess 76 could be accomplished using one or more non-annular recesses spaced circumferentially and/or axially staggered about the inner surface of collar 56 or the outer surface of the nozzle body, or even by a lower surface of the collar.

FIGS. 2-6 show a further example embodiment of the nozzle and collar in which further surfaces are provided. As with the embodiment shown in FIG. 1, in the example embodiment of FIGS. 2 to 6, the outer surface 28 of the nozzle body 24 includes annular projection 72 and the collar 56 includes cooperating annular recess 76. Additionally, in the embodiment of FIGS. 2-6, an annular projection 78 is located on the collar 56 axially adjacent to the annular recess 76, and the outer surface 28 of the nozzle body 24 defines an annular recess 80 axially adjacent to the annular projection 72.

Figure 2:
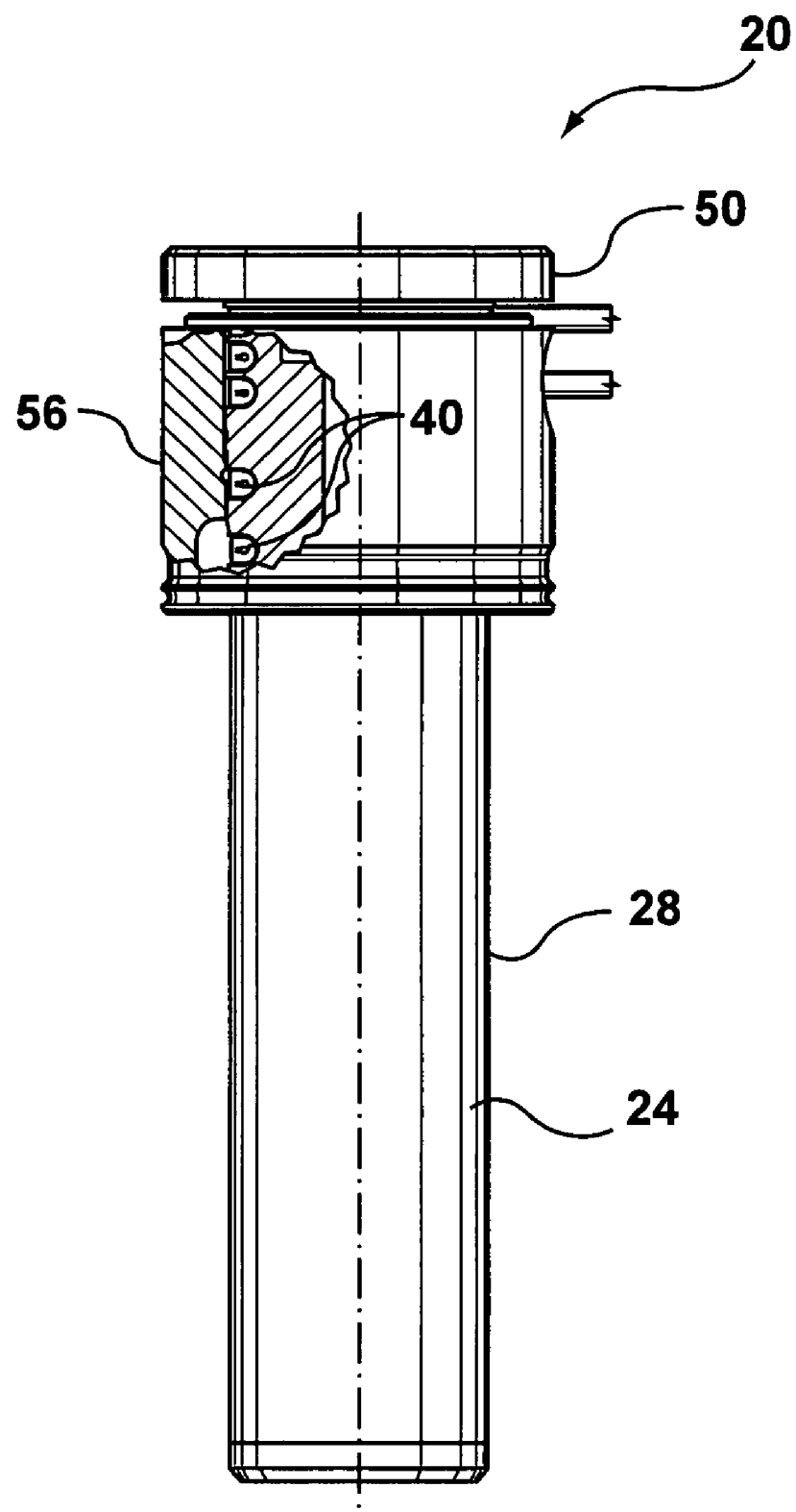
Figure 3:
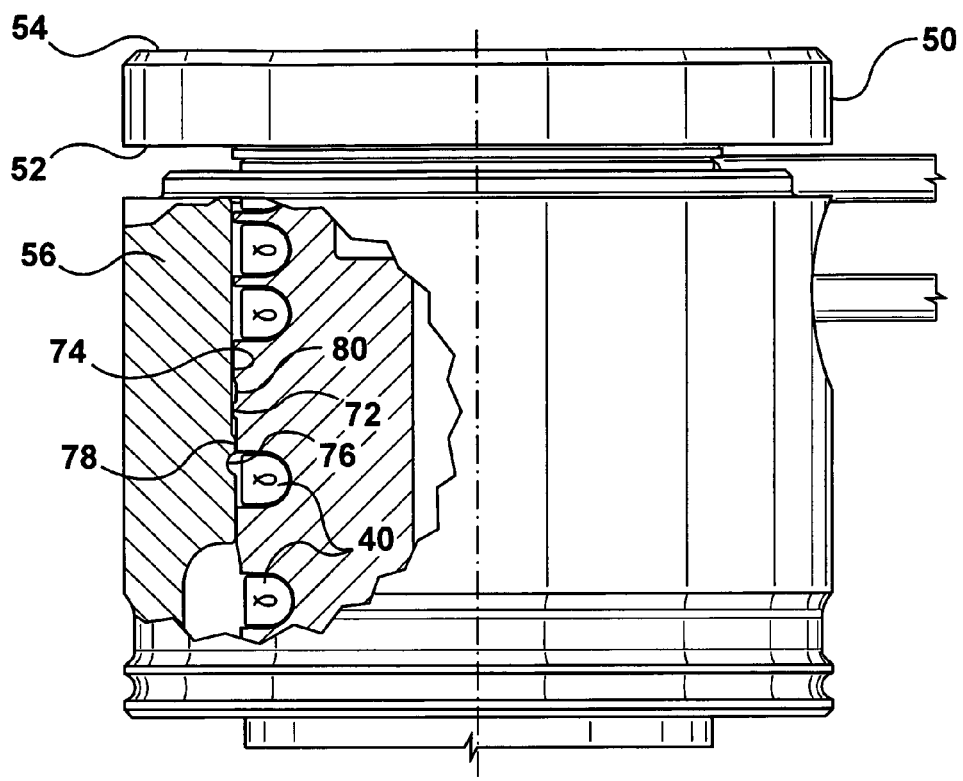
FIG. 3 is an enlarged view of the injection molding nozzle of FIG. 2.
Figure 4:
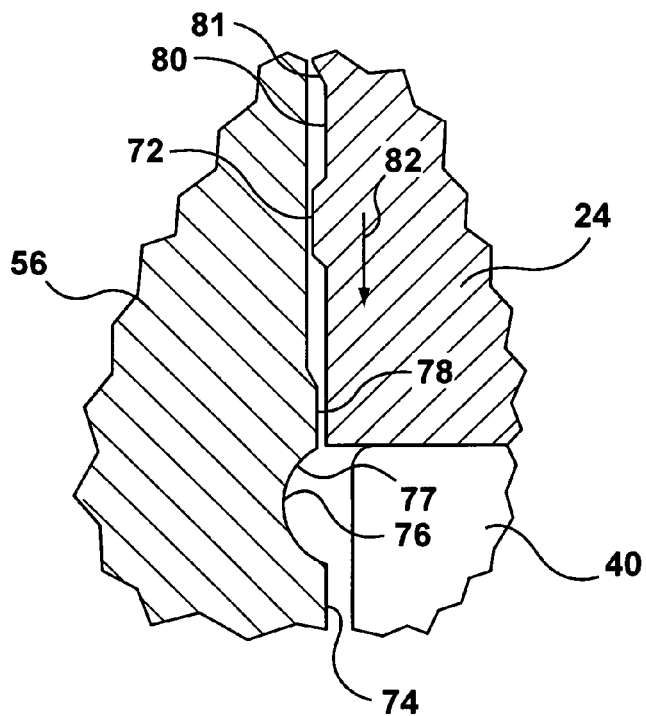
FIG. 4 is an enlarged view of the injection molding nozzle of FIG. 2 showing the flange and nozzle interface in a disengaged position.
Figure 5:
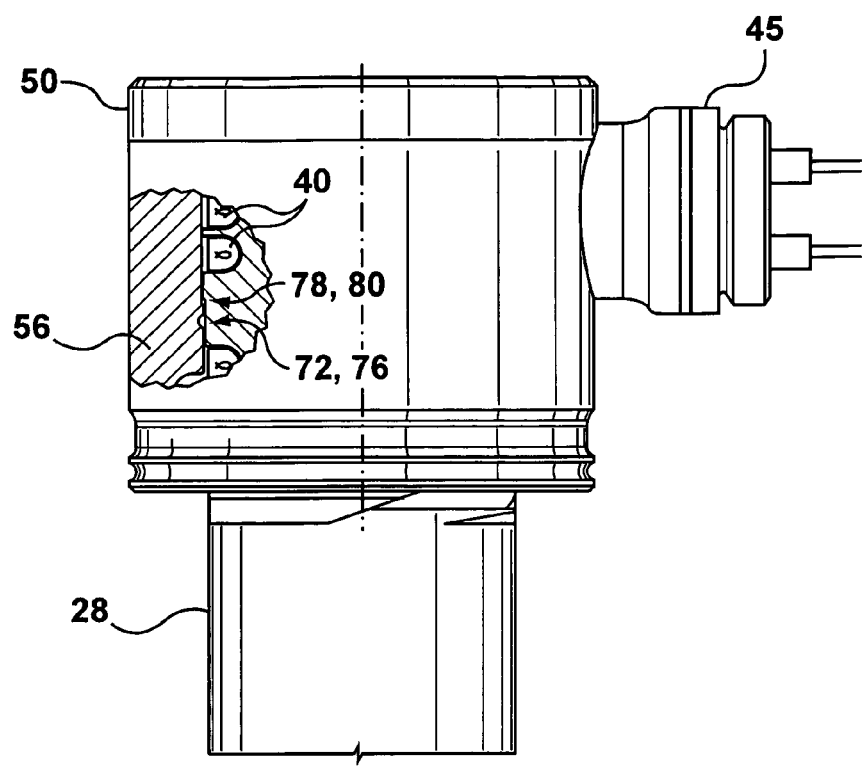
FIG. 5 is a partial cutaway view of the injection molding nozzle of FIG. 2 showing the flange installed on the nozzle.
Figure 6:
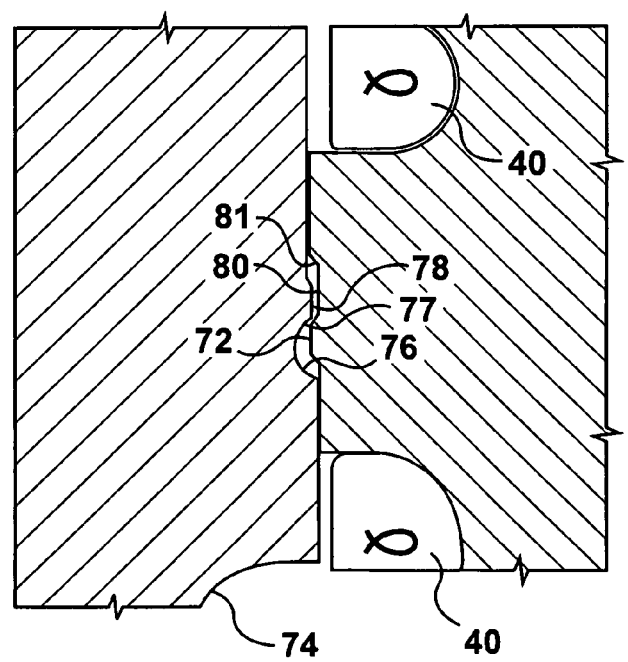
FIG. 6 is an enlarged view of the injection molding nozzle of FIG. 5 showing the flange and nozzle interface in an engaged position.

During installation of the collar 56 of FIGS. 2-6, the collar 56 may be placed around the nozzle body 24 as shown in FIG. 2 to 4. In this condition, the collar 56 surrounds the nozzle body 24 but is in an uninstalled or disengaged position. The collar 56 may be mounted or installed on the nozzle body 24 by the application of a downward force on the nozzle body indicated by the arrow 82 while an upward force in the opposite direction is applied on the collar 56. FIG. 5 and 6 illustrate the nozzle 20 with the collar 56 installed thereto. The movement of the collar 56 along the nozzle body causes it to snap-on to the nozzle body 24 in a removable fashion as the annular projection 72 on the nozzle body 24 slides into the annular recess 76 in the collar 56 and is releasably secured therein by an interference fit. Additionally, when the collar 56 is secured to the nozzle body 24 in this manner, the projection 78 of the collar 56 aligns with and is received in the annular recess 80 of the nozzle body 24 increasing the security of attachment as an upper shoulder 81 of recess 80 will engage the protrusion 78 to act against removal of the collar 56.

In the embodiments of FIGS. 1-6, the collar 56 need not be fixed to the nozzle body 24 using welding, brazing or other means. The interference fit created by the projection 72 and recess 76 is sufficient to retain the collar 56 to the nozzle body 24 during assembly.

During assembly of the injection molding apparatus 10, the nozzle 20 and secured collar 56 are lowered into the opening 32 in the mold plates 34 and 35. The collar 56 is located between the nozzle flange 50 and the shoulder 38 of the first mold plate 34. The collar 56 maintains sealing contact between the nozzle melt channel 22 and the manifold outlet 16. The mold contacting surface 59 is abutted against alignment wall 39 in mold plate 34 this arrangement is used to align the collar 56 and as a result the nozzle 20 with the mold gate 31. Although the mold contacting surface 59 is shown along the entire length of the collar 56, it may only comprise a portion of the collar to reduce the contact and thus the heat transfer between the collar 56 and the mold plate 34.

Although the example embodiments of FIGS. 1 to 6 show a collar 56 provided with an annular recess 76 and projection 78, in other embodiments these features may be provided on the nozzle body 24 and features of the annular projection 72 and annular recess 80 may be provided on the collar 56 rather than the nozzle body 24. Further, although the present invention has been described in relation to mounting the insulating flange (collar) to the nozzle body, the mounting techniques described may also be used to connect other components to the nozzle. For example, the terminal connector and the collar, and the tip retainer and nozzle tip may be mounted in a similar fashion with appropriate adjustments for those components.

It will be appreciated by a person skilled in the art that valve gated nozzles could be used instead of the thermal gated nozzles shown in FIGS. 1 to 6. Furthermore, one of ordinary skill in the art would appreciate that the present invention could be utilized in systems utilizing multiple nozzles with a single cavity or multi-tip nozzles.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A nozzle for an injection molding apparatus, comprising:
    a nozzle body having a nozzle melt channel for receiving a melt stream from a manifold melt channel, the nozzle body having an integral flange, said flange having a first surface that contacts a manifold of the injection molding apparatus;
    a collar removably mounted on the nozzle body, the collar having a first surface for supporting the flange of the nozzle body and a second opposing surface that contacts a mold plate; and
    one of the nozzle body and the collar having a shoulder formed therein and the other of the nozzle body and collar having a radially disposed protrusion for engaging the shoulder to act against separation of the collar from the nozzle body.

2. The nozzle of claim 1, wherein one of the nozzle body and the collar includes a further shoulder formed therein and the other of the nozzle body and the collar includes a further radially disposed protrusion for engaging the further shoulder to further act against separation of the collar from the nozzle body.

3. The nozzle of claim 1, wherein the shoulder is an annular shoulder formed on an inner surface of the collar and the protrusion is an annular protrusion extending about a circumference of an outer surface of the nozzle body.

4. The nozzle of claim 3, wherein the shoulder is provided by a surface of an annular recess formed on the inner surface of the collar.

5. The nozzle of claim 1, wherein the shoulder is provided by a recess formed in a surface of one of the nozzle body and the collar.

6. The nozzle of claim 1, wherein the shoulder is an annular recess extending about a surface of one of the collar and the nozzle body and the protrusion is an annular protrusion extending about a surface of the other of the collar and the nozzle body.

7. The nozzle of claim 1, wherein the collar, nozzle body, shoulder and protrusion are respectively sized such that the collar can be mounted on the nozzle body by sliding the collar along a part of the nozzle body until the protrusion snaps by the shoulder, thereby providing an interference fit between the collar and nozzle body.

8. The nozzle of claim 1, wherein the flange includes a second surface that opposes the first surface, wherein the second surface of the collar engages the second surface of the flange when mounted on the nozzle body.

9. The nozzle of claim 8, wherein the collar includes an outer surface for engaging an annular surface of a mold plate recess for positioning the nozzle body relative to a gate.

10. A nozzle for an injection molding apparatus, comprising:
    a nozzle body having a nozzle melt channel for receiving a melt stream from a manifold melt channel;
    a collar removably mounted on the nozzle body; and
    one of the nozzle body and the collar having a shoulder formed therein and the other of the nozzle body and collar having a radially disposed protrusion for engaging the shoulder to act against separation of the collar from the nozzle body, wherein the collar, nozzle body, shoulder and protrusion are respectively dimensioned to permit a limited amount of relative axial and radial movement between the collar and the nozzle body to account for differing thermal expansion properties of the collar and the nozzle body.

11. An injection molding apparatus, comprising:
    a manifold having a manifold melt channel for receiving a melt stream of moldable material;
    a mold plate spaced apart from the manifold and having a mold plate recess formed therein in alignment with a gate leading to a mold cavity;
    a nozzle including
        (i) a nozzle body with an upstream end coupled to the manifold and defining a nozzle melt channel for receiving the melt stream from the manifold melt channel, a portion of the nozzle body being received in the mold plate recess; and
        (ii) a locating collar removably mounted to the nozzle body and having a surface engaging the mold plate for locating the nozzle body relative to the mold plate; wherein one of the nozzle body and the collar have a shoulder formed therein and the other of the nozzle body and collar have a radially disposed protrusion for engaging the shoulder to act against separation of the collar from the nozzle body,
    wherein the nozzle includes a flange formed on the upstream end of the nozzle body, the flange having an upper surface contacting the manifold and a lower opposing surface, such that the collar extends from the lower surface of the flange to the mold plate, and wherein the flange and collar cooperating to align the nozzle melt channel with the manifold melt channel.

12. The injection molding apparatus of claim 11, wherein the mold plate recess includes a mold plate shoulder about a periphery thereof set back from an opening to the mold plate recess, and the collar extends into the mold plate recess and engages the mold plate shoulder and a circumference of the mold plate recess.

13. The injection molding apparatus of claim 11, wherein one of the nozzle body and the collar includes a further shoulder formed therein and the other of the nozzle body and the collar includes a further radially disposed protrusion for engaging the further shoulder to further act against separation of the collar from the nozzle body.

14. The injection molding apparatus of claim 11, wherein the shoulder is an annular shoulder formed on an inner surface of the collar and the protrusion is an annular protrusion extending about a circumference of an outer surface of the nozzle body.

15. The injection molding apparatus of claim 14, wherein the shoulder is provided by a surface of an annular recess formed on the inner surface of the collar.

16. The injection molding apparatus of claim 11, wherein the shoulder is provided by a recess formed in a surface of one of the nozzle body and the collar.

17. The injection molding apparatus of claim 11, wherein the shoulder is an annular shoulder extending about a surface of one of the collar and the nozzle body and the protrusion is an annular protrusion extending about a surface of the other of the collar and the nozzle body.

18. The injection molding apparatus of claim 11, wherein the collar, nozzle body, shoulder and protrusion are respectively sized such that the collar can be mounted on the nozzle body by sliding the collar along a part of the nozzle body until the protrusion snaps by the shoulder, thereby providing an interference fit between the collar and nozzle body.

19. The injection molding apparatus of claim 11, wherein the collar, nozzle body, shoulder and protrusion are respectively dimensioned to permit a limited amount of relative axial and radial movement between the collar and the nozzle body to account for differing thermal expansion properties of the collar and the nozzle body.

* * * * *